United States Patent [19]

Fijiwara et al.

[11] Patent Number: 4,601,736
[45] Date of Patent: Jul. 22, 1986

[54] DYNAMIC GAS FILTER APPARATUS

[75] Inventors: Keiji Fijiwara, Kyoto; Takaaki Shinoda; Shigehiro Kitou, both of Hyogo; Suenobu Kawabe, Osaka, all of Japan

[73] Assignee: Kabushikigaisha Takuma, Osaka, Japan

[21] Appl. No.: 668,846

[22] Filed: Nov. 6, 1984

[51] Int. Cl.⁴ ............................................. B01D 33/18
[52] U.S. Cl. ......................................... 55/479; 55/99
[58] Field of Search ................ 55/99, 79, 474, 479, 55/98

[56] References Cited

U.S. PATENT DOCUMENTS

| | | | |
|---|---|---|---|
| 3,800,508 | 4/1974 | Zenz | 55/96 |
| 4,004,897 | 1/1977 | Squires | 55/96 |
| 4,248,612 | 2/1981 | Wakabayshi et al. | 55/99 |
| 4,254,616 | 3/1981 | Siminski et al. | 55/79 |

FOREIGN PATENT DOCUMENTS

| | | | |
|---|---|---|---|
| 130575 | 11/1978 | Japan | 55/79 |
| 105219 | 6/1982 | Japan | 46/34 |
| 130529 | 8/1982 | Japan | 46/32 |
| 204215 | 12/1982 | Japan | 46/36 |
| 209621 | 12/1982 | Japan | 53/14 |
| 58-8533 | 1/1983 | Japan | 46/34 |
| 58-8532 | 1/1983 | Japan | 46/34 |
| 36516 | 2/1984 | Japan | 55/47 |
| 36517 | 2/1984 | Japan | 55/479 |
| 216675 | 6/1924 | United Kingdom | 55/474 |
| 2119675 | 11/1983 | United Kingdom | 55/474 |
| 674767 | 8/1979 | U.S.S.R. | 55/474 |

Primary Examiner—Bernard Nozick
Attorney, Agent, or Firm—Griffin, Branigan & Butler

[57] ABSTRACT

An apparatus (1) for filtering dust from a gas has a dynamic gas treatment region (54) defined by inflow screen (3) and outflow screen (53). A quantity of filter medium (5) from hopper (13) vertically traverses the gas treatment region (54) as dust-laden gas from gas inlet (14) contacts the filter medium (5) and moves through the gas treatment region (54) horizontally to gas outlet (15). Filter medium (5) which takes dust from the gas that is treated falls to the bottom of the gas treatment region (54). A first filter medium discharge device (8) is installed at the bottom of the gas treatment region (54) at the inflow side; and, a second filter medium discharge device (9) is installed at the outlet side at the bottom of the gas treatment region (54). The first and second discharge devices (8) and (9) are operated at different discharge rates, thus providing distinct inlet filter subregion (4a) and a distinct outlet filter subregion (4b) in the gas treatment region (54). The inflow screen (3) may be provided with louver plates (21) to cause a portion of the filter medium (5) to overflow toward the gas inlet (14) in a direction having a direction component anti-parallel to the direction of gas inflow.

7 Claims, 12 Drawing Figures

DYNAMIC GAS FILTER APPARATUS

BACKGROUND OF THE INVENTION

The invention relates to apparatus for separating dust from a dusty gas. More specifically, the invention relates to gas filters in which the dusty gas flows horizontally into a treatment chamber, and the filtering material flows vertically into the treatment chamber.

Figure 12:
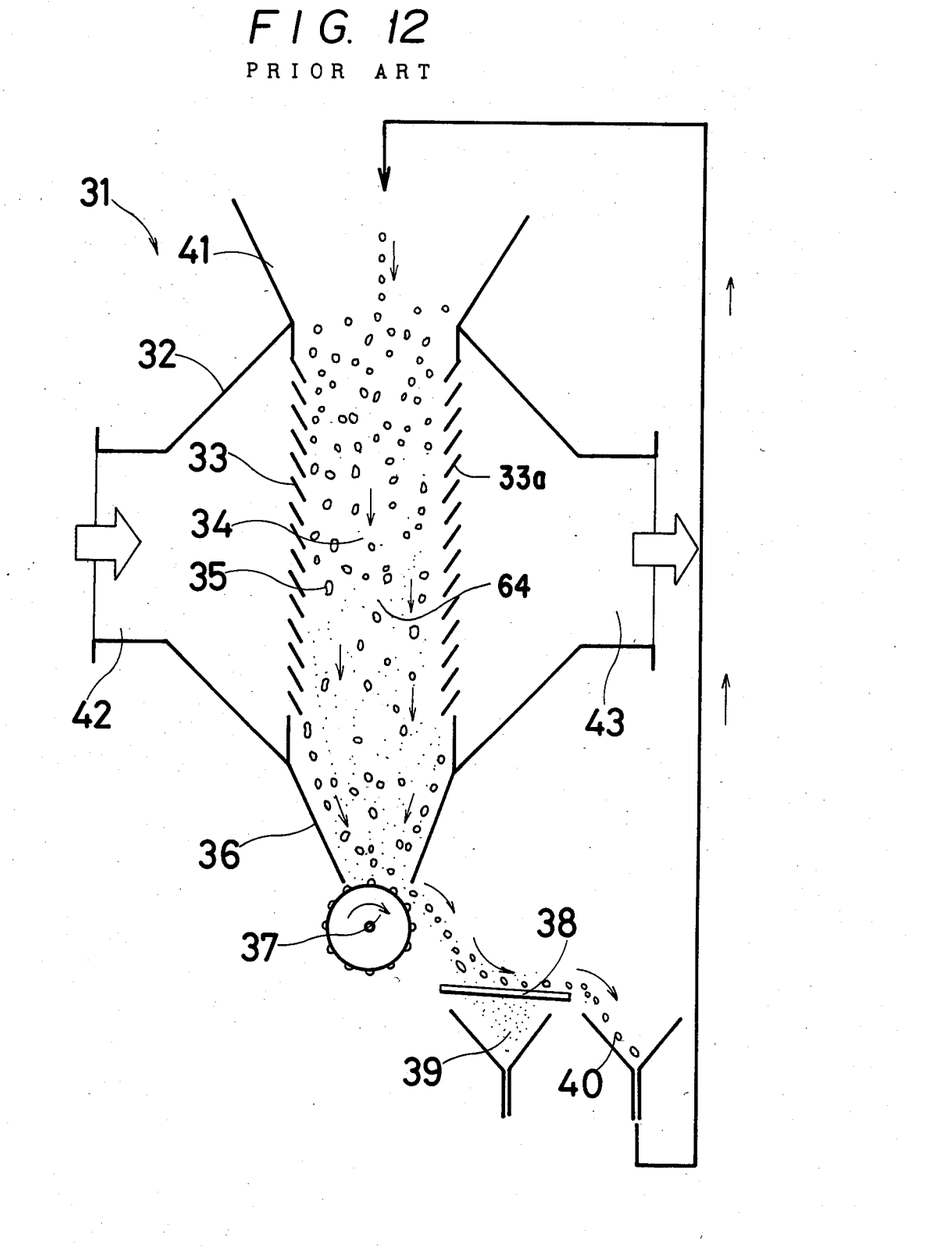

For an understanding of problems associated with prior art devices a prior art gas filtering apparatus is illustrated in FIG. 12. In the prior art apparatus 31, a housing 32 houses two screens 33, 33a defining a treatment chamber 64 into which particulate filter medium 34 and dust-laden gas from gas inlet 42 are fed and contacted. As the dust-laden filter medium particles 34 descend into chute 36, they are directed to rotary drum discharge apparatus 37 placed at the bottom of chute 36.

As the rotary drum discharge apparatus 37 rotates, dust-laden filter medium 34 is discharged onto vibrating sieve 38 on which dust 39 is shaken off of the dust-laden filter medium 34; and, cleaned filter medium 40 is recycled back into the gas treatment chamber 64.

The screens 33, 33a which define the gas treatment chamber 64 are designed to prevent particles of the filter medium 34 from flowing out of the gas treatment chamber 64 but allow the dust-laden gas that is treated to flow into and out of the gas treatment chamber 64.

Conventional dust filters as illustrated in FIG. 12 have several disadvantages. One disadvantage relates to elimination efficiency, and another disadvantage relates to treatment performance. Elimination efficiency is defined as the ratio of the difference between the dust concentration at the inlet of the gas treating chamber and the dust concentration at the outlet of the gas treating chamber divided by the dust concentration at the inlet (Di−Do)/Di.

The treatment performance is defined as the volume of the gas treated per unit of time (e.g. $Nm^3$/Sec. where N denotes the gas volume under standard temperature and pressure conditions and $m^3$ is cubic meters).

With the conventional dust filter, as the descending speed of the filter medium particles becomes slower, the elimination efficiency of the dust increases. This results in an increase in the pressure drop caused by the dust-laden gas because a larger amount of dust adheres to the filter medium particles and reduces the open spaces between the particles. Increased pressure drop across the treating chamber causes a decrease in the throughput and results in decreased treatment performance. If the pressure drop is great, a large blower with sufficient power to overcome the pressure drop and to increase treatment performance is required. A large blower consumes relatively large amounts of electric power and raises costs.

On the other hand, if the rate of descent of the filter medium particles in the gas treatment chamber is high, the amount of dust which adheres to the filter medium particles is small, and the pressure drop of the gas is also small. This condition would lessen the energy required to operate the blower, and treatment performance of the gas would increase. However, because, in this instance the spacing between the filter medium particles is relatively large, the dust can easily pass through the wide spaces, and the filter medium particles are unable to adequately separate dust from the gas thereby reducing elimination efficiency.

Thus it is seen that the two important parameters, treatment performance and elimination efficiency, are inversely related in a conventional dust filter apparatus. This is an undesirable situation because it is desirable that both parameters be maximized.

Additional problems are present with conventional dust filter apparatus. It has been observed that the amount of dust adhering to filter medium particles near the gas inlet differs significantly from the amount of dust particles adhering to the filter medium particles near the gas outlet. Thus, elimination efficiency depends upon localized conditions at both inlet and outlet regions. Not only does more dust adhere to the filter medium near the gas inlet but the pressure loss of the gas is also larger at the inlet side of the gas treatment region. In other words, the filter medium at the outlet side of the gas treatment chamber contributes very little to the elimination efficiency of the filter medium. Thus, there are important local effects in the filter medium in a horizontal direction along gas passage from into and out of the gas treatment chamber.

In certain types of conventional prior art dust separators, countercurrent methods are employed. For example, in a water jet gas washing device, highest efficiency is obtained when the direction of gas flow is anti-parallel with the water jet flow. Efficiency is greatest in this arrangement because of the increased probability of collision between dust and water droplets. However, countercurrent separation methods are not known to be in use with dry, dynamic gas filters depicted in FIG. 12.

Accordingly, it is a primary object of the present invention to provide an apparatus for treating dust-laden gas in which both the elimination efficiency and the treatment performance may both be optimized.

Another advantage of the present invetion is the provision of a gas treating apparatus in which local effects in a horizontal direction along gas passage are significantly reduced.

SUMMARY OF THE INVENTION

An improved gas filter apparatus is provided for removing dust from dust-laden gas. The improved filter apparatus includes first and second filter medium discharge means installed at the bottom of a gas treatment region. The first filter medium discharge means is installed at the inlet side, and the second filter medium discharge means is installed at the outlet side. The first discharge means is operated at a higher rate than the second discharge means. In this way, within the gas treatment region, there are created essentially two subregions: an inlet filter subregion; and, an outlet filter subregion.

Because the descending speed of the filter medium at the inlet side is faster than the descending speed of the filter medium at the outlet side, less particles will pile up at the inlet side, and the pressure loss at the inlet side is reduced; and, less pressure loss increases treatment performance. Because the descending speed of the filter medium at the outlet side is slower and because the filter medium at the outlet side of the gas treatment region is more effectively utilized to separate dust from the gas, the elimination efficiency at the outlet side increases.

Although not necessary an optional porous partition plate may be installed within the gas treatment region to provide a more clearly defined inlet filter subregion and outlet filter subregion.

The gas treatment region is defined by an inflow screen and an outflow screen. The inflow screen may be provided with means for causing a portion of the filter medium to overflow toward the gas inlet in a direction having a direction component anti-parallel to the direction of gas inflow. This overflow creates a countercurrent action in the horizontal direction. Since the dust filtration rate of the gas is highest at the inlet side of the filter medium, by having a portion of the filter medium moving in a countercurrent relation to the inflowing gas, a significant increase in elimination efficiency of the dust results.

Several alternative structures for the inlet screen provide the anti-parallel, countercurrent action of the invention. Plural parallel louver plates having inlet-slanting plates and outlet-slanting plates may be employed. Other embodiments of the inflow screen which bring about anti-parallel flow of filter medium toward the direction of gas inflow are described below with particular reference to specified drawing figures.

BRIEF DESCRIPTION OF THE DRAWINGS

The foregoing and other objects, features, and advantages of the invention will be apparent from the more specific description of preferred embodiments of the invention, as illustrated in the accompanying drawings in which reference characters refer to the same parts throughout the different views. The drawings are not necessarily to scale, emphasis instead being placed upon illustrating principles of the invention in a clear manner.

DETAILED DESCRIPTION OF THE PREFERRRED EMBODIMENTS

Figure 1:
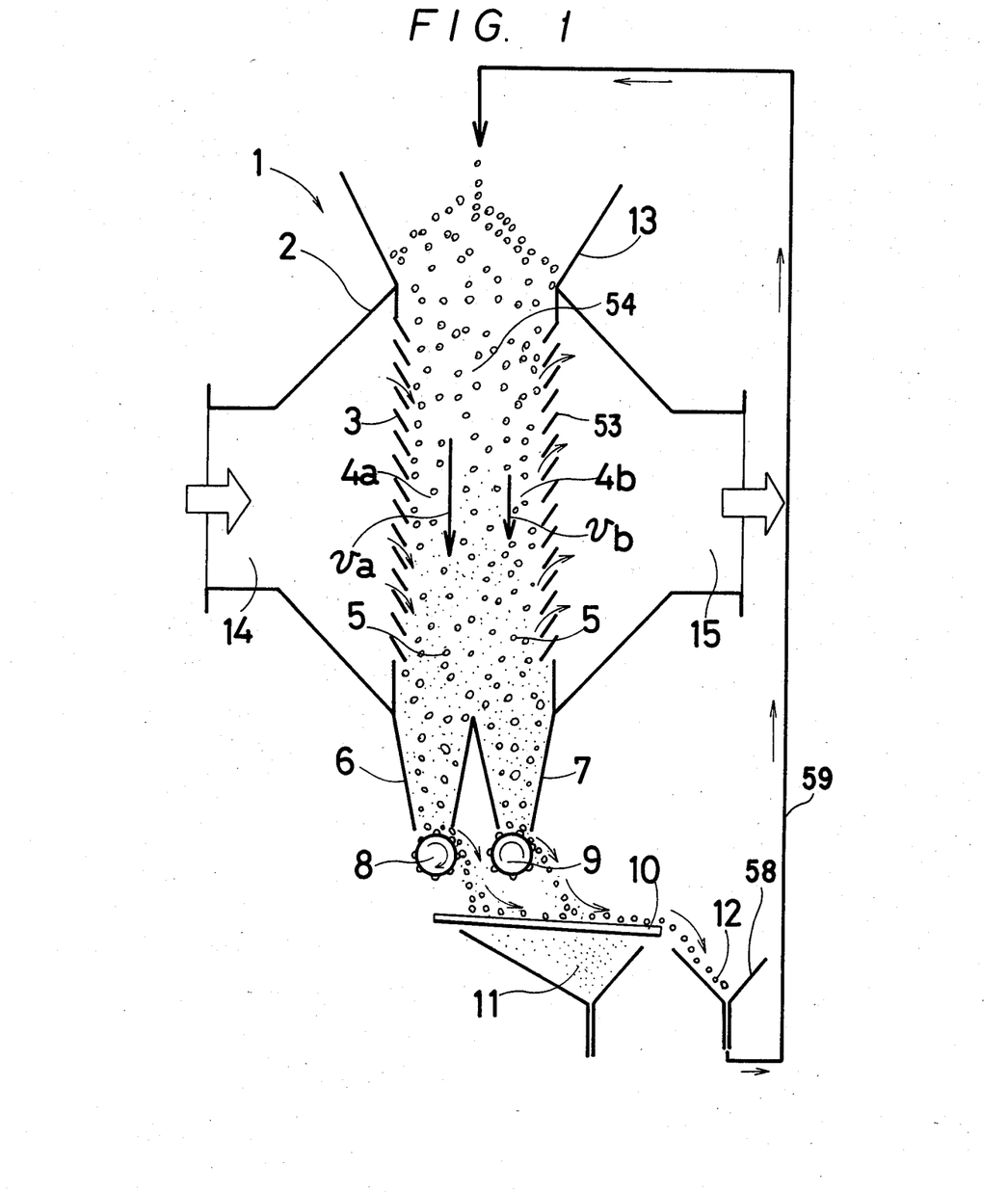
FIG. 1 is a vertical sectional view of a first embodiment of the dynamic gas filter of the invention.

Reference is made to FIG. 1 wherein filter apparatus 1 is comprised of housing 2 having a gas inlet 14 and a gas outlet 15. An inflow screen 3 receives inflow gas from the gas inlet 14. An outflow screen 53 lets gas out to the gas outlet 15. A gas treatment region 54 is defined by the inflow screen 3 and the outflow screen 53. A quantity of particulate filter medium 5 traverses the gas treatment region 54 by descending from hopper 13 to chutes 6 and 7. A first filter medium discharge apparatus 8 is installed below chute 6 at the inlet side of the bottom of the gas treatment region 54. A second filter medium discharge apparatus 9 is installed below chute 7 at the outlet side of the bottom of gas treatment region 54.

In operation, the first filter medium discharge apparatus 8 is driven faster than the second discharge apparatus 9. The disparity of driving rates between discharge apparatuses 8 and 9 causes two gas treatment subregions 4a and 4b to be created in gas treatment region 54. Subregion 4a is at the inlet side of region 54, and subregion 4b is at the outlet side of region 54. The rate of descent $v_a$ of the filter medium 5 in the inlet filter subregion 4a is faster than the rate of descent $v_b$ of the filter medium 5 in the outlet filter subregion 4b. Expressed mathematically, $v_a > v_b$.

Because the rate of descent of the filter medium 5 at the inlet side is relatively fast, dust-laden filter medium does not accumulate into a pile within gas treatment region 54 and the pressure loss of gas is relatively low. Furthermore, because the rate of descent of the filter medium 5 at the outlet side is relatively slow, the dust in the gas which has passed through inlet filter subregion without being caught by the filter medium is caught and retained by the filter medium in the outlet filter subregion 4b.

Figure 2:
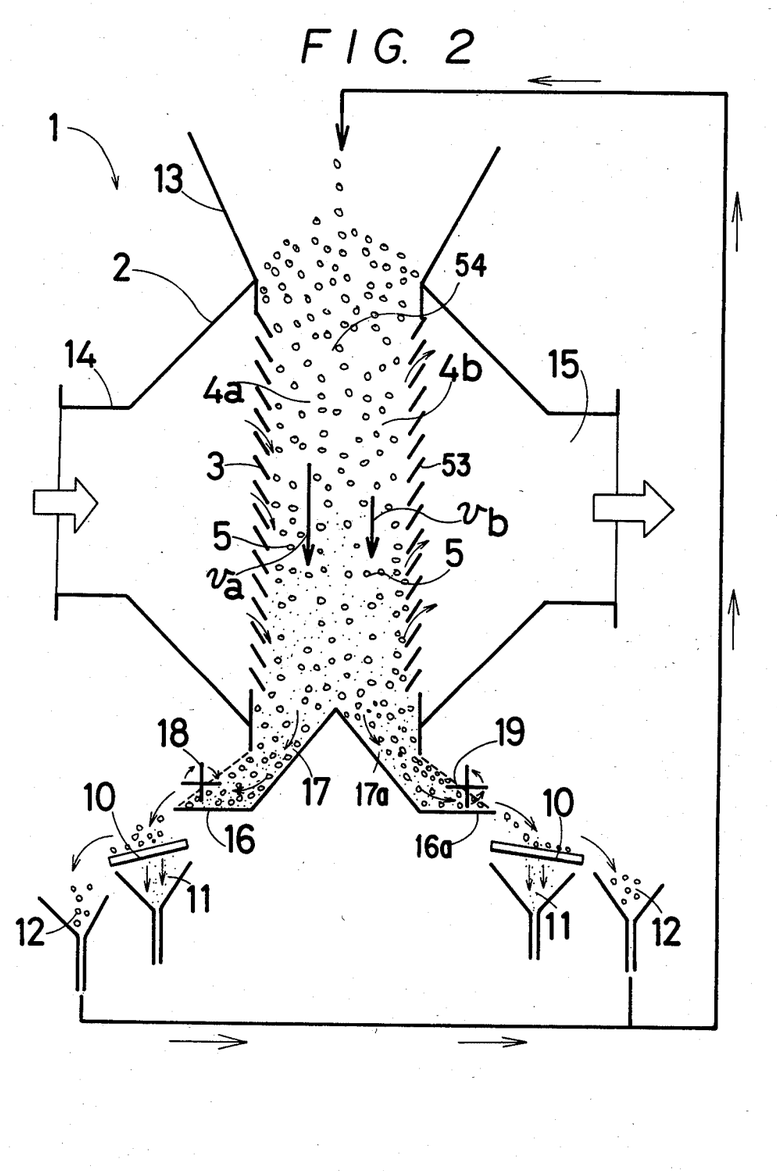
FIG. 2 is a vertical sectional view of a second embodiment of the invention.
Figure 3:
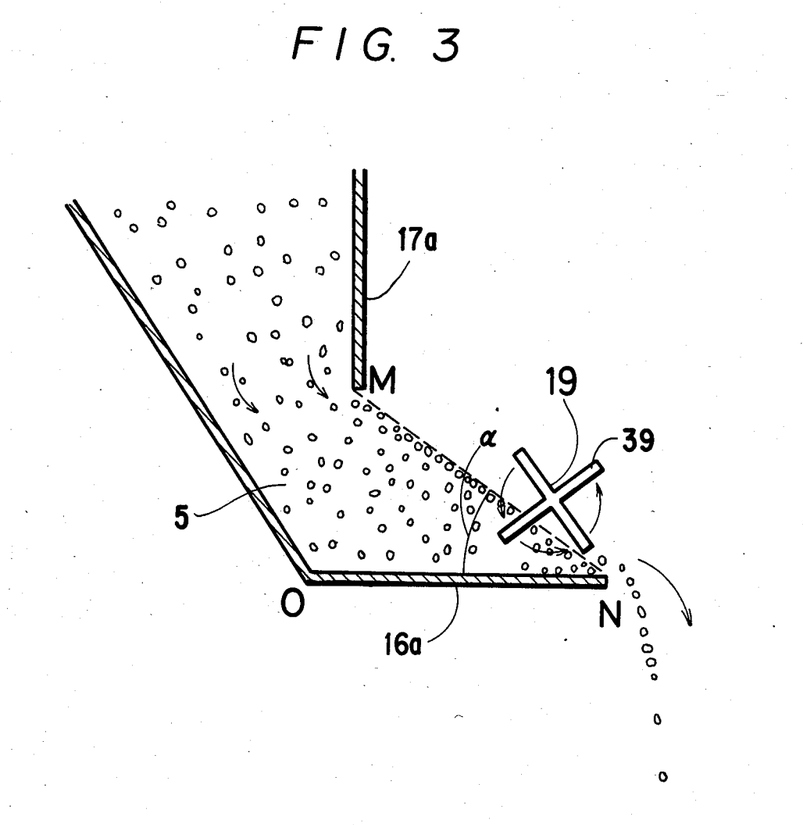
FIG. 3 is an enlarged sectional view of the discharge device of the second embodiment.
Figure 4:
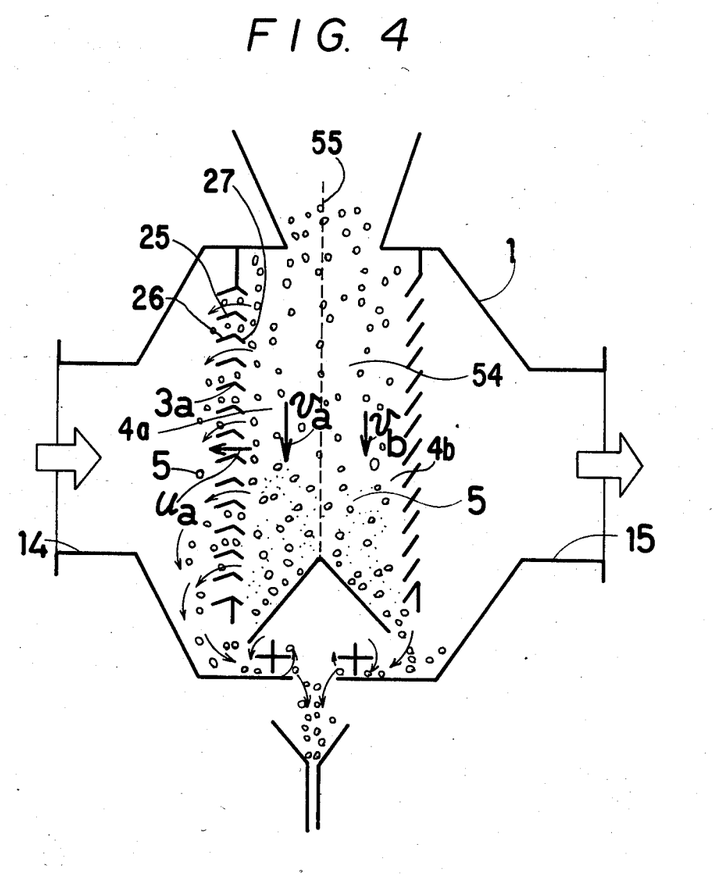
FIG. 4 is a vertical sectional view of a third embodiment of the invention.

As shown in FIG. 1, the filter medium discharge apparatuses 8 and 9 may be rotating drums. Alternatively, as shown in FIGS. 2-4, the filter medium discharge apparatuses may be axially mounted, rotating, filter medium sweeping devices such as bristles or paddles.

In FIG. 1, apparatus for cleaning dust-laden filter medium particles 5 and recycling clean filter medium particles is comprised of vibrating sieve 10, sieve overflow hopper 58, recycle conveyor 59, and hopper 13. Dust-laden filter medium 5 falls on the vibrating sieve 10 which separates dust 11 from the filter medium 5. The dust 11 falls downward along a chute to a water basin (not shown). The clean filter medium 12 enters overflow hopper 58 and is recycled to hopper 13 by conveyor 59.

Because the filter medium is used repeatedly, rigid granular particles with high mechanical strength are preferred for the filter medium. Suitable particles are ores, metals, porcelain, or shingle.

In overall operation, dust-laden gas enters the housing 2 from the gas inlet 14, passes through inflow screen 3, contacts a quantity of particulate filter medium 5 in gas treatment region 54, passes through outflow screen 53 and emerges from gas outlet 15.

FIG. 2 shows another embodiment of the apparatus of the invention. In this embodiment, at the bottom ends of inlet filter subregion 4a and outlet filter subregion 4b are two separate bottom plates 16 and 16a and two separate branched chutes 17 and 17a. Above the bottom plate 16 at the inlet side, a first filter medium discharge apparatus 18 employing an axially mounted, rotating, filter medium sweepers such as paddles or bristles is shown. A second filter medium discharge apparatus 19 having axially mounted, rotating bristles or paddles for moving filter medium 5 is located at the bottom plate 16a of the outlet side.

FIG. 3 shows an enlarged view of the filter medium discharge apparatus 19. The filter medium 5 flows out from the bottom end M of vertical chute plate 17a onto bottom plate 16a.

A slant line between bottom end M and the end N of bottom plate 16a is MN. A horizontal line running along bottom plate 16a between plate ends O and N is ON. The angle between the horizontal line ON and the slant line MN is nearly equal to the drain angle $\alpha$ of the filter medium 5.

The discharge apparatus 19 is oriented with respect to slant line MN so that the paddles or bristles 39 are not submerged under filter medium 5. In other words, the axis of rotation of the rotating bristles or paddles 39 for moving the filter medium particles 5 and discharging them is located above the slant line MN. When the paddles or bristles 39 operate in this way, electric power is conserved and operation of the discharge apparatus may be maintained continuously and at a controlled quantitative discharge rate.

FIG. 4 shows another embodiment of the invention. In this embodiment, inflow screen 3a is comprised of plural parallel louver plates 25 (see FIG. 9) having an inlet-planting plate 26 and an outlet-slanting plate 27. As shown in FIG. 4, a portion of filter medium 5 is overflowing between the spaced-apart louver plates 25 in a direction towards gas inlet 14. Actually, a directional component of the movement of the filter medium particles toward the gas inlet 14 is anti-parallel to the direction of gas inflow.

Since dust elimination efficiency is highest at the inlet side of the gas treating region, by having a portion of filter medium 5 at the inlet side move in a direction having a directional component anti-parallel to the direction of gas inflow, dust elimination efficiency is further enhanced. The directional component indicating anti-parallel direction to the direction of gas inflow is represented by arrow $u_a$.

In FIG. 4, optional porous partition plate 55 is installed within gas treatment region 54 to provide a more clearly defined inlet filter subregion 4a and outlet filter subregion 4b.

The resultant in speed and direction of the filter medium 5 overflowing through inlet screen 3a is determined by the square root of the sum of the squares of $v_a$ and $u_a$.

To bring about effective anti-parallel movement of the filter medium 5 toward the direction of gas inflow, reference is made to FIGS. 6–10 which depict louver screens providing filter medium anti-parallel backflow.

Figures 5, 6, 7:
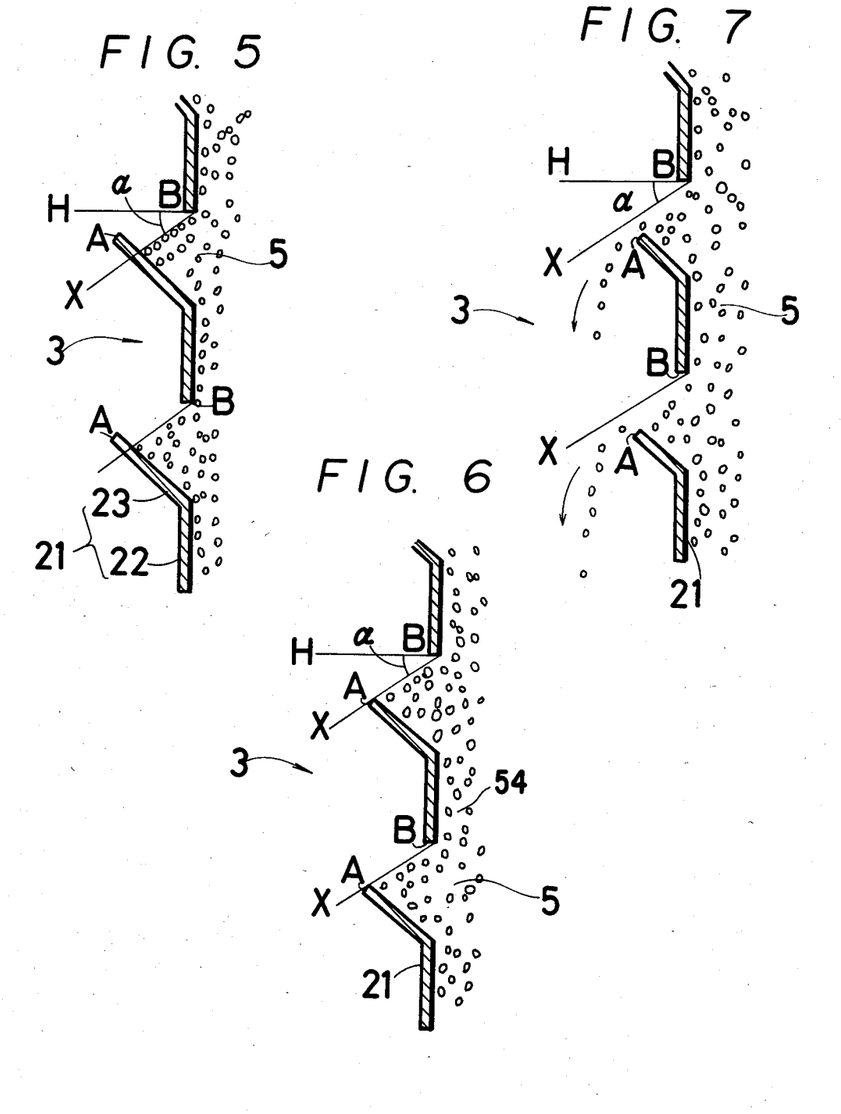
FIG. 5 is an enlarged sectional view of a part of a louver screen from which the filter medium does not overflow.
FIG. 6 is an enlarged sectional view of a part of a louvered inflow screen from which the filter medium overflows only as the filter medium is descending.
FIG. 7 is an enlarged sectional view of a part of a louvered inflow screen from which the filter medium overflows both when descending and not descending.

Before considering the louver arrangements for bringing about filter medium backflow, first consider FIG. 5 in which no backflow is present. Several louver plates 21 of inlet screen 3 are shown in FIG. 5. A louver plate 21 has a vertical plate portion 22 and a forward bent plate portion 23 which bends away from the vertical plate portion 22 at an obtuse angle. Slant line BX coincides with line BX which is the drain angle slant line of the fluid medium 5. The drain angle $\alpha$ of the filter medium 5 is defined by the angle between horizontal line BH and drain angle slant line BX. In FIG. 5, the top point A of a louver plate projects above the drain angle slant line BX drawn from the bottom end B of the next upper louver plate. Thus, the filter medium 5 does not overflow out of the louver screen 3 because it remains below the drain angle slant line BX.

FIG. 6 shows an embodiment of a louver screen which provides for filter medium anti-parallel backflow toward the direction of gas inflow. Here, the top point A of a louver plate lies just on the drain angle slant line BX drawn from the bottom end B of the next upper louver plate. In this case, the filter medium remains stationary and does not drain as long as the filter medium discharge device is not operated. However, when additional filter medium 5 descends into gas treatment region 54, a portion of filter medium 5 overflows between the gaps between the louver plates. This is so because the dynamic drain angle is less than the static drain angle in the case of granular particles.

FIG. 7 illustrates another embodiment of louver plates in which filter medium backflow occurs. Here, the top point A lies below the drain angle slant line BX drawn from the bottom end B of the next upper louver plate along the surface of the draining filter medium. The filter medium 5 overflows from the louver screen toward the direction of gas inflow at all times. The amount of overflow in unit time is determined by the width of the gap between neighboring louver plates.

Figures 8, 9, 10:
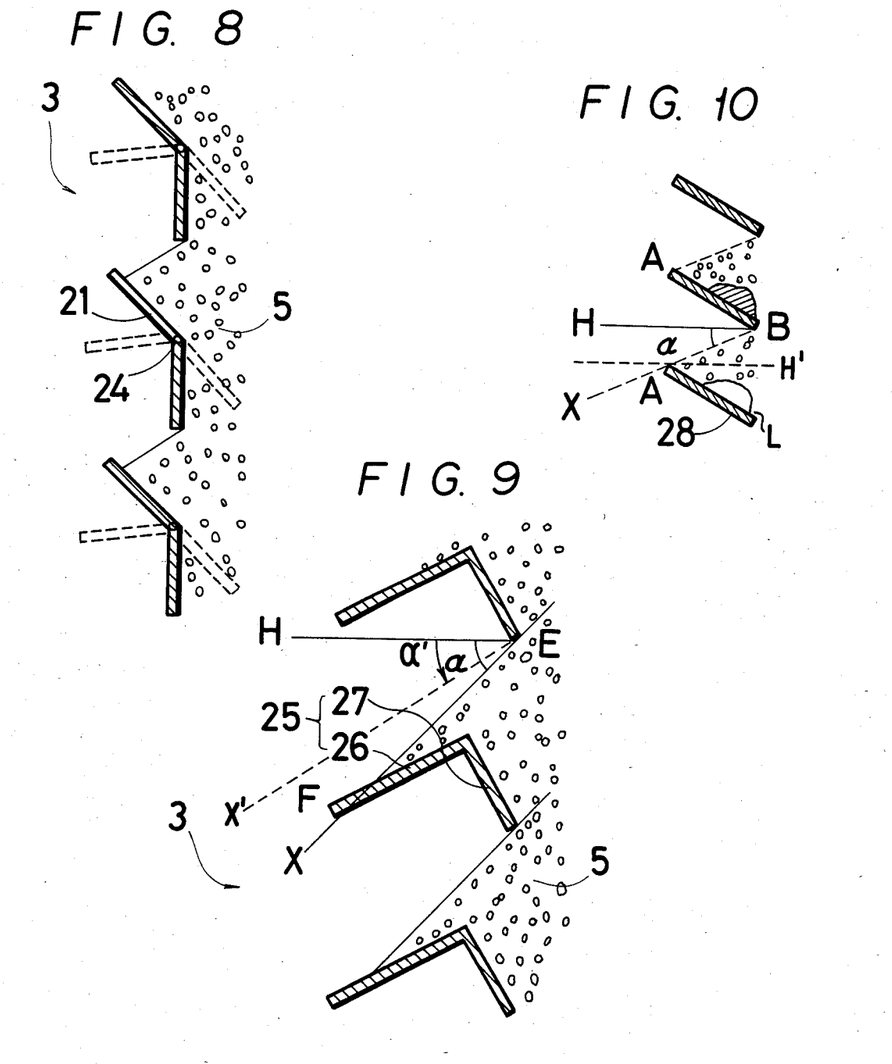
FIG. 8 is an enlarged sectional view of a part of a louvered inflow screen having pivoted louver plates for controlling the amount of overlow of the filter medium.
FIG. 9 is an enlarged sectional view of a part of a louver screen in which the filter medium overflows only when the filter medium is descending.
FIG. 10 is an enlarged sectional view of a part of a louver screen having louver plates with a linear cross-section.

FIG. 8 illustrates yet another louver plate embodiment providing for filter medium anti-parallel backflow. Louver plates 21 are rotatable around pivots 24 and can be adjusted to any of a variety of selectable positions. When the louver plates 21 are in the position shown by solid lines, the filter medium 5 does not overflow. This position is analogous to the louver plate depicted in FIG. 5.

However, when the louver plates 21 in FIG. 8 are in the position indicated by the broken lines, the filter medium 5 continually overflows in an anti-parallel direction toward the direction of gas inflow. This orientation is comparable to the louver arrangement depicted in FIG. 7.

Thus, the amount of overflow of the filter medium 5 can be readily controlled by rotating the louver plates 21 to selected positions.

FIG. 9 depicts still another embodiment of louver plates. Louver plate 25 is comprised of an inlet-slanting plate 26 and an outlet-slanting plate 27. Both plates 26 and 27 meet nearly at right angles. A static drain angle slant line EX is drawn from the rear end E of the outlet-slanting plate 27. Drain angle $\alpha$ is formed between drain angle slant line EX and horizontal lien EH. Drain angle $\alpha$ illustrates the static drain angle. There is a forward point F that projects above the static drain angle slant line EX. When the filter medium is at rest, it does not overflow from the louver plates. However, when the filter medium is descending, it overflows over the louver plates because the dynamic drain angle $\alpha'$ is less than the static drain angle $\alpha$, and dynamic drain angle slant line EX' is above and forward of point F.

FIG. 10 illustrates another embodiment of a louver screen in which anti-parallel backflow of filter medium 5 can be controlled. In FIG. 10 the top point A of a louver plate lies along a drain angle slant line BX drawn from the bottom end B of the next upper louver plate. Like the embodiment in FIG. 6, the filter medium overflows only when it is descending.

In FIG. 10, a louver plate slant line AL is drawn along the upper surface of a lower plate. A horizontal line H' intersects line AL at point A, the upper end of louver plate 28. If the slant angle LAH' of the louver plate 28 is less than the drain angle $\alpha$, then lumps of filter medium 5 will remain stationary on the louver plate 28. Therefore, the louver plate illustrated in FIG. 9 is preferred over the louver plate in FIG. 10 because for both parts 26 and 27 of louver plate 25, the slant angle of the louver plate parts favors draining of filter medium 5.

Figure 11:
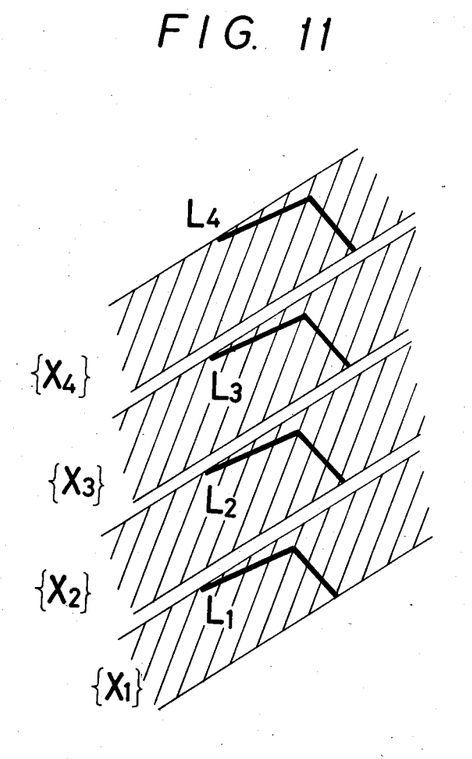
FIG. 11 is an interpretive view of a louver screen to demonstrate the general conditions for overflowing of the filter medium; and, FIG. 12 is a vertical sectional view of a conventional PRIOR ART gas filter apparatus.

A general rule can de deduced from consideration of the previous examples. FIG. 11 is a simplified vertical section of louver plates to demonstrate the general rule. Louver plates $L_1, L_2, \ldots L_n$ are arranged from bottom to top. Only $L_1$–$L_4$ are shown in FIG. 11. $X_1$–$X_4$ show families of drain angle slant lines associated with each respective louver plate $L_1$–$L_4$.

The general rule that has been deduced regarding anti-parallel backflow of filter medium 5 has two parts. First, if the i-th family of drain angle slant lines has common slant lines with the (i+1)-th family of drain angle slant lines, then the filter medium 5 does not overflow between the i-th and (i+1)th louver plates. Second, if the i-th family of drain angle slant lines has no common elements with the (i+1)-th family of slant lines, then the filter medium 5 overflows between the gap between the i-th and (i+1)-th louver plates.

For this rule to apply, all louver plates need not be of the same shape and size, and all louver plates need not be positioned at the same spacing interval. For example, if the gaps between the louver plates is narrower toward the top of the louver plate array than toward the bottom of the louver plate array, the rule would hold and the overflow of filter medium 5 would become more energetic in the lower part of the louver plate array.

While the invention has been particularly shown and described with reference to the preferred embodiments thereof, it will be understood by those skilled in the art that various alterations in form and detail may be made therein without departing from the spirit and scope of the invention.

The embodiments of the invention in which an exclusive property or privilege is claimed are defined by the following:

1. An apparatus for filtering dust from a gas, comprising:

a housing having a gas inlet, a gas outlet, and a bottom;

an inflow screen for receiving inflow gas from said gas inlet;

an outflow screen through which said gas passes as it flows toward said gas outlet;

a gas treatment region located within said housing;

a quantity of granular filter medium traversing said gas treatment region for removing dust from the gas;

filter medium discharge means installed at the bottom of said gas treatment region;

cleaning means for cleaning said granular filter medium and for returning the cleaned filter medium to said gas treatment region;

said inflow screen being operative to selectively cause a portion of said granular filter medium to overflow towards said gas inlet in a direction having a directional component antiparallel to the direction of gas inflow;

said inflow screen including a plurality of louvers located above each other, each louver including an inlet slanting plate having first and second ends and an outlet slanting plate having first and second ends, said second end of each of said outlet slanting plates being joined to a first end of an inlet slanting plate to form an obtuse angle therebetween;

said inlet slanting plates being directed downwardly from the horizontal at an angle so that said first end thereof is above the static drain-angle-slant-line of said inflow screen, but below the dynamic drain-angle-slant-line of said inflow screen whereby said granular filter medium overflows said inlet slanting plate towards said gas inlet when said granular filter medium is discharged from said discharge means, but does not overflow said inlet slanting plate when said granular filter medium is not discharged from said discharge means.

2. The apparatus of claim 1 wherein said outlet slanting plate is directed downwardly from the horizontal at an angle that is greater than the dynamic drain angle of said inflow screen.

3. The apparatus of claim 1 including pivot means for selectively pivoting said louvers about a horizontal axis.

4. The appartus of claim 3 wherein said outlet slanting plate is directed downwardly from the horizontal at an angle that is greater than the dynamic drain angle of said inflow screen.

5. An apparatus for filtering dust from a gas, comprising:

a housing having a gas inlet, a gas outlet, and a bottom;

an inflow screen for receiving inflow gas from said gas inlet;

an outflow screen through which said gas passes as it flows toward said gas outlet;

a gas treatment region located within said housing;

a quantity of granular filter medium traversing said gas treatment region;

filter medium discharge means installed at the bottom of said gas treatment region;

cleaning means for cleaning said filter medium and for returning the cleaned filter medium to said gas treatment region;

said inflow screen being operative to selectively cause a portion of said filter medium to overflow towards said gas inlet in a direction having a directional component anti-parallel to the direction of gas inflow;

said inflow screen including a plurality of louvers located above each other, each louver including an inlet slanting plate having first and second ends and an outlet slanting plate having first and second ends, said second end of each of said outlet slanting plates being joined to a first end of an inlet slanting plate to form an obtuse angle therebetween; and, pivot means for selectively pivoting said inlet slanting plate about a horizontal axis so that the overflow of said granular filter medium over said inlet slanting plate is selectively controlled by selectively pivoting said first end of said inlet slanting plate above and below the dynamic drain-angle-slant-line of said inflow screen.

6. The apparatus of claim 5 wherein said outlet slanting plate is pivotable with said inlet slanting plate.

7. The apparatus of claim 5 wherein said outlet slanting plate makes an angle below the horizontal that is greater than the drain angle of said inflow screen when said inlet slanting plate is below the drain-angle-slant-line of said inflow screen.

* * * * *